United States Patent [19]

Fontanilla

[11] Patent Number: 5,141,793

[45] Date of Patent: Aug. 25, 1992

[54] PRESSURE SENSITIVE TAPE FOR INSULATION APPLICATIONS

[75] Inventor: Dennis G. Fontanilla, East Hanover, N.J.

[73] Assignee: Compac Corporation, Netcong, N.J.

[21] Appl. No.: 615,431

[22] Filed: Nov. 16, 1990

[51] Int. Cl.$^5$ .................................................. B32B 7/10
[52] U.S. Cl. ............................... 428/42; 428/40; 428/41; 428/343; 428/352; 428/354
[58] Field of Search ................ 428/40, 41, 42, 352, 428/354, 343; 156/218; 138/141

[56] References Cited

U.S. PATENT DOCUMENTS

| | | | |
|---|---|---|---|
| 4,022,248 | 5/1977 | Hepner et al. | 138/141 |
| 4,157,410 | 6/1979 | McClintock | 428/40 |
| 4,243,453 | 1/1981 | McClintock | 156/152 |
| 4,264,388 | 4/1981 | McClintock | 156/152 |
| 4,389,270 | 6/1983 | McClintock | 456/218 |
| 4,513,039 | 4/1985 | Esmay | 428/40 |
| 4,584,217 | 4/1986 | McClintock | 428/40 |
| 4,595,615 | 6/1986 | Cohen | 428/36 |
| 4,606,957 | 8/1986 | Cohen | 428/40 |
| 4,704,315 | 11/1987 | McClintock | 428/40 |
| 4,755,410 | 7/1988 | Cohen | 428/58 |
| 4,778,700 | 10/1988 | Pereira | 428/40 |
| 4,778,703 | 10/1988 | Fontanilla | 428/40 |
| 4,780,347 | 10/1988 | Cohen | 428/36 |
| 4,937,111 | 6/1990 | Fontanilla | 428/34.1 |

*Primary Examiner*—Ellis P. Robinson
*Assistant Examiner*—Charles R. Nold
*Attorney, Agent, or Firm*—Edgar A. Zarins; Malcolm L. Sutherland

[57] ABSTRACT

A pressure sensitive tape construction for a pipe insulation system which is applied to the split of the insulation tube such that the insulation can be secured in a closed position. The tape construction includes a resealable cohesive layer which allows the insulation tube to be stored and transported in a closed position and thereafter opened for application or repositioning on the pipe. The tape construction also includes outer release liners which protect corresponding layers of conventional tacky adhesive utilized to secure the tape to the insulation. The tape is applied to the overlap flap of the insulation jacket by applying the respective tacky adhesive surfaces to the overlapping surfaces of the flap. The flap is opened for installation of the insulation by lifting a central release linear from the cohesive bonding layer. Upon removal of the central release liner along with the cohesive bonding layer, the flap may be permanently sealed.

9 Claims, 2 Drawing Sheets

PRESSURE SENSITIVE TAPE FOR INSULATION APPLICATIONS

BACKGROUND OF THE INVENTION

I. Field Of The Invention

This invention relates to an adhesive tape construction for providing a temporary and a permanent seal for an insulation system and, in particular, to a pressure sensitive tape construction which incorporates a releasable cohesive bonding layer for temporary closure during storage and initial installation of the insulation, the cohesive bonding layer being removable to permit permanent seal between adhesive layers and a bond-enhancing surface for final installation of the insulation.

II. Description of the Prior Art

Conventionally, glues, heat or solvent actuatable adhesive films or pressure sensitive tapes have been used to join items such as sections of insulation. Generally, pre-applied pressure sensitive tapes offer the greatest ease of handling and convenience. However, there is a continuous effort to improve the state of the art as to bond strength and temporary closure systems for storage and transport. Tape systems are typically applied in two different manners. A double-faced tape may be applied to one surface and thereafter brought into contact with the other surface to permanently join the surfaces and seal the insulation system. Alternatively, a dual tape system can be employed wherein one strip is applied to one surface and a second strip is applied to the other surface. The bond is affected by bringing the two surfaces together to adhere the tape strips. Prior to permanent sealing, the tacky adhesive surfaces are protected by removable release liners. In a variation of the two tape system, a single intermediate release liner may be used between the adhesive surfaces of each tape in order to join the surfaces during storage. However, because it is often necessary to separate at least one of the adhesive surfaces from the release liner, the adhesive surface can be exposed to dust and debris prior to final bonding resulting in a poor seal. In addition, it is often difficult to obtain exact registration of the adhesive layer with the central release liner if final bonding is not desired resulting in a poor final bond. As a result, the insulation jacket may inadvertently open causing damage to the insulation jacket.

Currently, both supported and unsupported pressure sensitive tapes are used in the insulation industry to join and seal the overlapping ends of the vapor-barrier cover of the pipe insulation jacket. However, these prior known tape constructions do not develop the desired enhanced bond, cannot be applied at sub-freezing temperatures and rely on the coated release liners for resealable connection of the overlapping ends. Using the adhesive layers to temporarily reseal the insulation system deteriorates the adhesive resulting in a poor final bond.

SUMMARY OF THE PRESENT INVENTION

The present invention overcomes the disadvantages of the prior art by providing a pressure sensitive tape construction for a pipe insulation system which incorporates a resealable cohesive bonding layer which is removed for permanent installation to join the adhesive surface to a clean, bond enhancing surface.

A preferred embodiment of the tape according to the present invention comprises outer tacky adhesive layers protected by outer release liners, a central release liner attached to inner surface of one adhesive layer having the cohesive bonding layer on the inner side thereof, and bonding surface adhered to the inner surface of the other tacky adhesive layer such that the cohesive bonding layer comes into selective contact with the bonding surface. The cohesive bonding layer creates a surface tension bond with the bonding surface to permit repeated re-closure of the tape until final bonding is desired. The tape construction is mounted to the overlapping end of the insulation jacket by engaging the tacky adhesive to the flap after removing one of the outer release liners. Following removal of the other outer release liner, the second adhesive surface is mounted to the opposing surface of the insulation jacket thereby forming a temporary closure. The temporary closure may be released and reclosed simply by separating the cohesive layer from the bonding surface by lifting the flap using the central release liner. Upon permanent installation of the pipe insulation, the central release liner and cohesive layer are separated from the tape to expose the adhesive layer which can be adhered to the bonding surface.

The primary or sealing adhesive is a composition of unique polymers to achieve sub-freezing bondability without sacrificing elevated temperature properties. A higher interface bond strength is achieved through the use of fillers, reinforcers, adhesion promoters and surface modifiers. The cohesive layer to achieve a resealable cohesion is also a composition of polymers achieving a consistent level of low adhesion to the bond-enhancing polymer film. Thus, the present invention provides a tape construction and insulation system which allows pre-assembly of the insulation tube so as to prevent damage thereto prior to permanent installation and permanent sealing of the insulation.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED Embodiment Of The Present Invention

Figure 1:
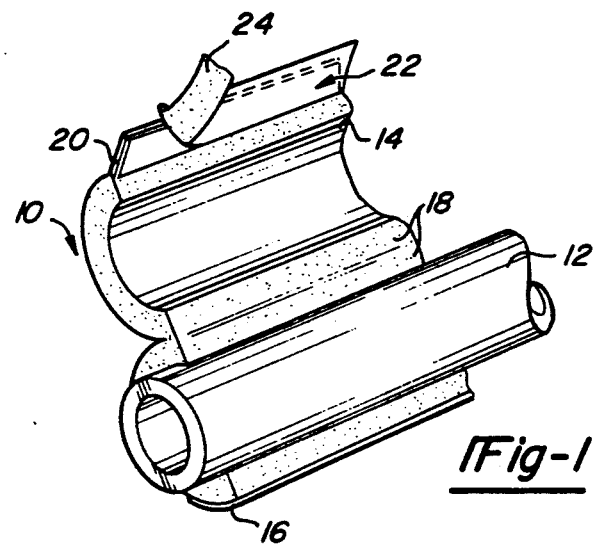
FIG. 1 is a perspective view of a pipe insulation system incorporating the pressure sensitive tape construction of the present invention.

Referring first to FIG. 1 through 4, there is shown a sealable insulation system 10 such as can be used in insulating a pipe 12. In a preferred embodiment of the present invention, the insulation system 10 comprises a tubular fiberglass-based body 14 and an outer moisture resistant covering 16. However, it shall be understood that non-tubular insulation may employ the present invention. In order to facilitate installation of the insulation 10, the tubular body 14 is preferably split into two symmetrical halves which are joined along at least one common edge 18 by the covering 16. In this manner, the covering 16 acts as a hinge, as shown in FIG. 1, to allow the insulation to be mounted about the pipe 12. In addition, the covering 16 seals the hinged split 18 to maintain the insulating properties of the insulation system 10.

Figure 2:
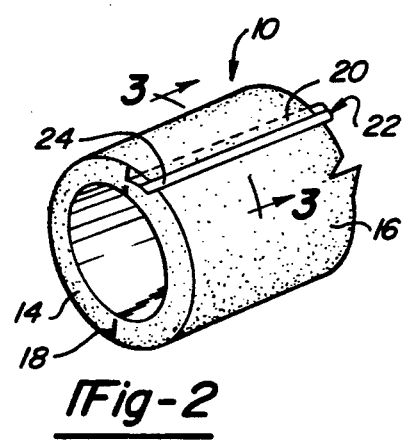
FIG. 2 is a perspective view of the pipe insulation system temporarily sealed by the tape construction of the present invention.
Figure 3:
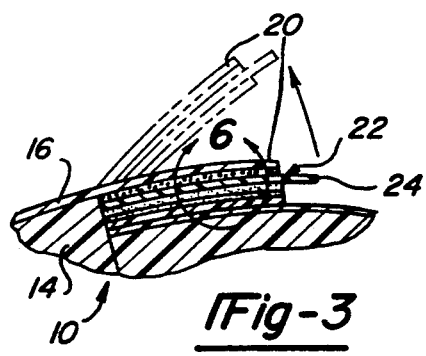
FIG. 3 is a cross-sectional view of the insulation system with the tape construction.
Figure 4:
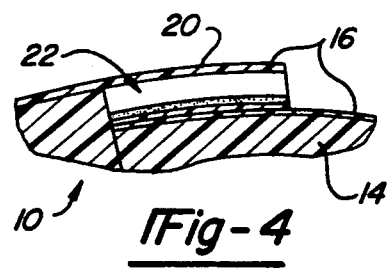
FIG. 4 is a cross-sectional view of the pressure sensitive tape of the present invention.

In order to fully maintain the insulating integrity of the insulation system 10 it is necessary to cover and seal the remaining longitudinal split upon installation. It is also preferred that the insulation 10 be maintained in the closed position for ease of storage and transport prior to permanent installation. In a preferred embodiment of the insulation system 10, the covering 16 includes an overlapping flap 20 which can extend across the split to engage the opposite edge of the covering 16 as shown in FIG. 2. A pressure sensitive tape 22 is utilized to provide a resealable temporary closure of the insulation 10 and permanent sealing upon installation of the insulation 10 on the pipe 12. The tape 22, which may be supplied in a bulk roll, is applied to the overlapping flap 20 and the outer surface of the covering 16 on the opposite edge of the insulation 10 to facilitate closure thereof as will be described in greater detail.

Figure 5:
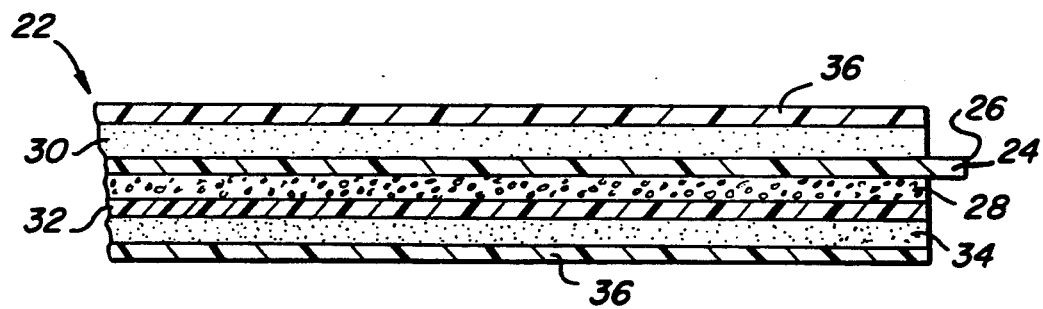
FIG. 5 is a cross-sectional view of the pressure sensitive tape with removable outer release lining.
Figure 6:
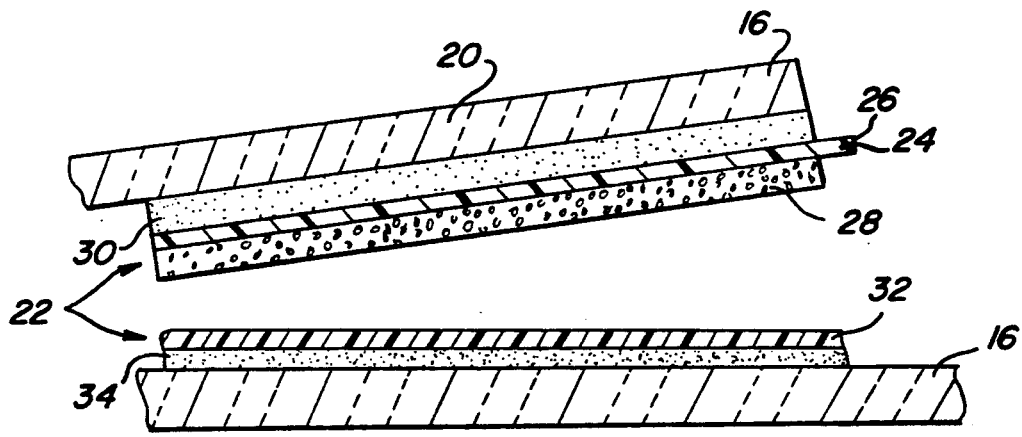
FIG. 6 is a cross-sectional view of the pressure sensitive tape installed in the insulation system with the temporary closure.
Figure 7:
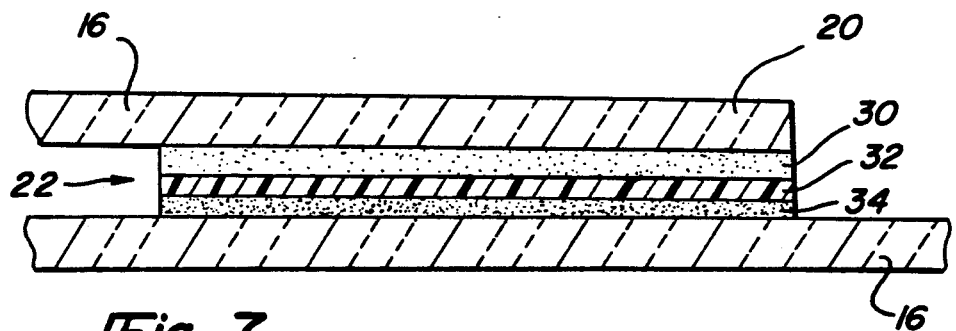
FIG. 7 is a cross-sectional view of the insulation system permanently sealed by the tape construction of the present invention.

Referring now to FIGS. 5 through 7, the tape construction 22 embodies several layers of adhesives and intermediate films to create not only a permanent sealing closure of the insulation 10 but also means of repeatedly opening and closing the insulation 10 during initial assembly, storage, installation and final positioning. However, the temporary closure is exercised without detriment to the final permanent seal. The tape 22 includes an intermediate release liner 24 which has a longitudinal edge 26 that extends beyond the edge of the tape construction 22 to permit the user to conveniently separate the tape construction 22 for opening and closing the insulation 10 and ultimate sealing as will be described. The intermediate release liner 24 carries a layer of cohesive material 28 which has low-adhesion properties for repeated temporary closure. Affixed to the opposite side of the intermediate release liner 24 is a first layer of tacky, pressure sensitive adhesive 30. The cohesive layer 28 is affixed to a bond-enhancement film 32 which has a second layer of tacky, pressure sensitive adhesive 34 affixed to its opposite side. The first and second adhesive layers 30, 34 are used to mount the tape 22 to the covering 16 of the insulation 10. Outer release liners 36 are utilized to protect the adhesive layers 30, 34 until application. As is well known in the industry, the release liners 36 are preferably coated with a release coating, such as a silicone coating, in order to permit convenient removal of the liners 36.

The composition of the adhesive layers 30, 34, the bond enhancement film 32 and the cohesive layer 28 and their interactive bond facilitates a convenient resealable closure as well as a permanent seal. Under a preferred embodiment, the pressure sensitive sealing adhesive 30, 34 is in the range of one-thousandth to five-thousandths of an inch in thickness. The pressure sensitive adhesive is a high performance adhesive polymerized from such film forming monomers as 2-ethyl hexyl acrylate, butyl acrylate, methyl methacrylate aylic acid, methacrylic acid, styrene or butyl acetate. Resins, anti-oxidants, fillers and extenders, plasticizers, processing aids, heat stabilizers, flame retardants, ultraviolet stabilizers, cross-linking agents and other enhancement additives may be added to improve the properties of the adhesive. As a further enhancement, the adhesive has low glass transition temperature which allows the tape 33 to be applied in sub-freezing temperatures yet capable of withstanding elevated temperatures.

The resealable adhesive of the cohesive layer 28 which forms the temporary closure is a low-adhesion material which forms a breakable surface tension bond. The base film forming component could be an acrylic, natural rubber or synthetic rubber. The cohesive layer 28 is in the range of one-thousandth to five-thousandths of an inch in thickness.

The bond-enhancement film 32 may be corona treated or untreated polyester film, polyvinyl chloride film, or glassine surfaced paper in thicknesses of up to ten-thousandths of an inch.

The tape construction 22 of the present invention provides a repeatedly resealable closure and a permanent sealing closure for the insulation system 10. The tape 22 is secured to the underside of flap 20 by removing one of the outer release liners 36 and applying the exposed pressure sensitive adhesive layer 30 to the flap 20. The other release liner 36 is removed exposing the second pressure sensitive adhesive layer 34 which is attached to the outer surface of the covering 16 on the opposite edge of the insulation as shown in FIG. 2. With the tape construction 22 attached to the insulation, the covering 16 can be opened and closed as necessary prior to permanent installation. The intermediate release liner 24 extends beyond the edge of the tape 22 to facilitate separation of the cohesive layer 28 form the bond-enhancement film 32 as shown in FIG. 6. Thus, to open the insulation tube 10 for installation, the intermediate release liner 24 and cohesive layer 28 are separated from the bond-enhancement film 32 and the tube 10 is opened to be placed about the pipe 12. The tube 10 can be rejoined without effecting a permanent bond simply by placing the cohesive layer 28 in contact with the film 32. This can be accomplished repeatedly for repositioning, etc. without detriment to the temporary closure. When it is desired to permanently bond the overlap thereby sealing the insulation jacket 10, the intermediate release liner 24 is removed carrying with it the cohesive layer 28. Thereafter, the bonding adhesive 30 is joined with the bond enhancement film 32 to permanently seal the insulation as shown in FIG. 7.

The bond enhancement film 32 provides a positive adhesive surface for the bonding adhesive 30 which cannot be achieved with a mere adhesive 30 to adhesive 34 bond or an adhesive 20 to covering 16 bond. The nature of the covering 16 is a rough and uneven surface which does not lend itself to absolute sealing. Gaps may be formed between ridges and other blemishes which can eventually result in a loss of seal. The bond-enhancement film 32 provides a smooth surface for adherence of the adhesive layers 30, 34. Thus, the present invention provides a tape construction and insulation system which allows pre-assembly of the insulation tube so as to prevent damage thereto prior to permanent installation and permanent sealing of the insulation upon final installation.

The foregoing detailed description has been given for clearness of understanding only and no unnecessary limitations should be understood therefrom as some modifications will be obvious to those skilled in the art without departing from the scope and spirit of the invention as defined in the appended claims:

What is claimed is:

1. A tape construction for sealing abutting portions of insulation comprising:
   an intermediate release liner having a first and a second surface;
   a first layer of bonding adhesive affixed to said first surface of said intermediate release liner;
   a layer of cohesive material affixed to said second surface of said intermediate release liner;
   a bond enhancement film affixed to said layer of cohesive material, said film having a first surface engaging said layer of cohesive material; and
   a second layer of bonding adhesive affixed to a second surface of said bond enhancement film;
   said layer of cohesive material creating a non-sealing surface tension bond with said bond enhancement film for a resealable closure between said cohesive layer and said film whereby said cohesive layer may be repeatedly detached from said bond enhancement film to open the insulation without degradation of said surface tension bond, said intermediate release liner and said cohesive layer being removable from said tape construction for permanent sealing between said first layer of adhesive material and said bond enhancement film.

2. The tape construction as defined in claim 1 and further comprising first and second outer release liners affixed to said first and second layers of bonding adhesive, said outer release liners being removable for bonding said adhesive layers to respective overlapping surfaces of the insulation.

3. The tape construction as defined in claim 1 wherein at least one edge of said intermediate release liner extends beyond the edge of said tape construction to facilitate selective separation of said layer of cohesive material from said bond enhancement film.

4. The tape construction as defined in claim 1 wherein said layer of cohesive material is a low-adhesion adhesive selected form the group consisting of an acrylic base adhesive, a natural rubber base adhesive, and a synthetic rubber base adhesive.

5. The tape construction as defined in claim 4 wherein said bond enhancement film is selected from the group consisting of a polyester film, a polyvinylchloride film, a polypropylene film, a polyethylene foam and a glassine surface paper.

6. The tape construction as defined in claim 1 wherein at least one of said bonding adhesive layers in an acrylic adhesive having low-temperature bonding properties and elevated temperature resistance.

7. A tape construction for sealing abutting portions of insulation comprising:
   an intermediate release liner having a first and a second surface;
   a first layer of bonding adhesive affixed to said first surface of said intermediate release liner for securing said tape construction to a first surface of the insulation;
   a layer of cohesive material affixed to said second surface of said intermediate release liner, said layer of cohesive material being removed from said tape construction upon removal of said intermediate release liner;
   a bond enhancement film detachably affixed to said layer of cohesive material, said film having a first surface engaging said layer of cohesive material; and
   a second layer of bonding adhesive affixed to a second surface of said bond enhancement film for securing said tape construction to a second surface of the insulation;
   said layer of cohesive material creating a non-adhesive surface tension bond to said film forming a selectively resealable closure between said cohesive layer and said first surface of said film for a temporary closure of the insulation whereby said cohesive layer may be repeatedly detached from said bond enhancement film to open the insulation without degradation of said surface tension bond, said intermediate release liner being removable from said tape construction for permanent sealing between said first layer of adhesive material and said first surface of said bond enhancement film for permanent closure of the insulation.

8. The tape construction as defined in claim 7 and further comprising a first outer release liner affixed to said first layer of bonding adhesive and a second outer release liner affixed to said second layer of bonding adhesive for protection thereof, said outer release liners being removable for bonding said adhesive layers to opposing overlapping surfaces of the insulation.

9. The tape construction as defined in claim 7 wherein said layer of cohesive material is carried on said intermediate release liner, at least one edge of said intermediate release liner extending beyond the edge of said tape construction to facilitate selective separation of said layer of cohesive material from said bond enhancement film to open said temporary closure and removal of said intermediate release liner and cohesive layer from said tape construction for permanent sealing of said tape construction and insulation.

* * * * *